(12) United States Patent
Ricke et al.

(10) Patent No.: US 7,228,931 B2
(45) Date of Patent: *Jun. 12, 2007

(54) AGRICULTURAL APPLICATOR CONFIGURATION FOR ENHANCED VISIBILITY

(75) Inventors: Keith M. Ricke, Willmar, MN (US); Rex L. Ruppert, Benson, MN (US)

(73) Assignee: CNH America LLC, Racine, WI (US)

( * ) Notice: Subject to any disclaimer, the term of this patent is extended or adjusted under 35 U.S.C. 154(b) by 309 days.

This patent is subject to a terminal disclaimer.

(21) Appl. No.: 10/883,329

(22) Filed: Jul. 1, 2004

(65) Prior Publication Data

US 2006/0000654 A1    Jan. 5, 2006

(51) Int. Cl.
    B62D 61/05    (2006.01)
    B62D 33/06    (2006.01)
(52) U.S. Cl. .................................. 180/215; 180/89.12
(58) Field of Classification Search ............ 180/89.12, 180/210, 215, 432, 435, 437, 439; 280/270, 280/271, 276
See application file for complete search history.

(56) References Cited

U.S. PATENT DOCUMENTS

| D193,838 S | | 10/1962 | Drevfuss et al. |
| 3,519,097 A | | 7/1970 | Commons |
| 3,643,899 A | | 2/1972 | Firestone |
| 3,884,322 A | * | 5/1975 | Nemschoff .................. 181/204 |
| 3,946,824 A | | 3/1976 | Jester et al. |
| 3,998,489 A | | 12/1976 | Blakeslee |
| D245,331 S | * | 8/1977 | Tangeman .................... D15/13 |
| D270,351 S | | 8/1983 | Montgomery et al. |
| D279,569 S | | 7/1985 | Miggels et al. |
| 4,605,259 A | | 8/1986 | Hurlburt |
| 5,152,364 A | | 10/1992 | Woods et al. |
| 5,413,188 A | | 5/1995 | Ui |
| D402,947 S | | 12/1998 | Weddle |
| D410,012 S | | 5/1999 | Goebert et al. |
| 5,906,411 A | | 5/1999 | Stauffer et al. |
| 5,911,624 A | * | 6/1999 | Stauffer ....................... 454/158 |
| 6,206,120 B1 | | 3/2001 | Lykken et al. |
| D451,106 S | | 11/2001 | Crookes et al. |
| 6,460,643 B1 | | 10/2002 | Degelman |
| 2003/0126847 A1 | * | 7/2003 | Matousek et al. .............. 56/66 |

(Continued)

OTHER PUBLICATIONS

AGCO, Terra-Gator 4-Wheel Applicator Chassis Sales Brochure, 2003, all pages.

(Continued)

*Primary Examiner*—Paul N. Dickson
*Assistant Examiner*—Joseph Rocca
(74) *Attorney, Agent, or Firm*—Rebecca Henkel

(57) ABSTRACT

A configuration of a three-wheeled agricultural applicator is provided that enhances visibility or the field of view of an operator. The three-wheeled agricultural applicator includes a frame assembly having a fork assembly and a kingpin extending generally upward therefrom. The three-wheeled agricultural applicator further includes a steering assembly that includes a steering wheel interlinked by a left steering actuator and a right steering actuator with a steering plate attached at the top of the kingpin. This configuration allows a hood associated with a drive unit of the three-wheeled agricultural applicator to be angled in a downward direction towards the forward direction of travel, thus enhancing the operator's field of view.

20 Claims, 5 Drawing Sheets

U.S. PATENT DOCUMENTS

2006/0000397 A1 * 1/2006 Ricke et al. ................ 111/200

OTHER PUBLICATIONS

AGCO, Terra-Gator 3-Wheel Applicator Chassis Sales Brochure, all pages.
Agchem, Terra-Gator 8144 & 8104 Sales Brochure, 1999, all pages.
Agchem, Terra-Gator 8103 Sales Brochure, 1998, all pages.
Agchem, Terra-Gator 1903 Sales Brochure, 1998, all pages.
Agchem, Terra-Gator 1803 Sales Brochure, all pages.
Agchem, Terra-Gator 1603T Sales Brochure, all pages.
Agchem, Terra-Gator 1803 info request, all pages.
Agchem, Terra-Gator 1903 info request, all pages.

* cited by examiner

AGRICULTURAL APPLICATOR CONFIGURATION FOR ENHANCED VISIBILITY

FIELD OF THE INVENTION

The invention relates to a configuration of an agricultural applicator and, more particularly, to a configuration of a three-wheeled agricultural applicator which provides an operator an enhanced field of view.

BACKGROUND OF THE INVENTION

Numerous types of agricultural applicators or tractors are available today. These can include a pull-type unit or a self-propelled unit. A certain known agricultural applicator is also referred to as a "floater." The floater is a large vehicle that uses large, oversized floatation tires to carry the vehicle across firm to muddy agricultural environments. A typical floatation chassis assembly includes a pair of rear floatation tires and a front floatation tire. The chassis assembly is configured to support one or more bulk storage tanks or bins of product for application in an agricultural environment, usually before planting in the spring or after harvest in the fall. The types of agricultural products e.g., fertilizer, herbicide, pesticide, nutrients, etc. can vary. The floater can also be utilized to tow various agricultural implements. The oversized-tired agricultural applicators are generally desired for their ability to maneuver heavy loads over extremely rough and difficult agricultural terrain with minimal soil compaction.

However, these floater-type agricultural applicators or tractors have drawbacks. Typical three-wheeled floaters include a long and generally horizontally-aligned hood configured in such a manner so as to inhibit the field of view of an operator stationed within the agricultural applicator's cab.

For example, U.S. Pat. No. 5,152,364 to Woods et al. discloses a tractor configuration with a long, flat hood extending along a generally horizontal alignment toward a nose. The long, horizontal extending hood inhibits the field of view of an operator stationed with the tractor's cab.

Accordingly, there is a desire for a configuration of a three-wheeled vehicle (e.g., floater) that enhances the field of view of an operator stationed with the vehicle's cab.

SUMMARY OF THE INVENTION

The present invention provides a three-wheeled vehicle configured with an enhanced field of view for an operator. The three-wheeled vehicle includes a frame assembly in support of a drive unit interconnected to drive the frame assembly on three wheel assemblies in a forward direction of travel. One of the three wheel assemblies is a single front wheel assembly. The frame assembly includes a fork assembly and a kingpin extending in a generally upward direction therefrom. The fork assembly is mounted on the single front wheel assembly. The three-wheeled vehicle further includes a steering assembly, the steering assembly generally comprising a steering wheel interlinked with a steering plate by a left steering actuator and a right steering actuator. The steering plate is attached at the top of the kingpin extending upward from the fork assembly. This configuration of the three-wheeled vehicle allows the hood over the drive unit to be sloped downward and adjacent to the steering plate in a manner that enhances a field of view of an operator of the vehicle.

The preferred three-wheeled vehicle includes a cab and a hood located forward of the cab relative to the forward direction of travel. The cab, as generally used in conjunction with the agricultural applicator discussed above, includes an operator's station located inside of an enclosure of transparent panels. The operator's station includes a seat and a steering console in support of a steering wheel, and is configured in such a manner for an operator to operate the three-wheeled agricultural applicator.

The cab enclosure includes preferably four vertical support members in support of four transparent panels between a floor base and a ceiling support. The four vertical supports generally include a first vertical support and a second vertical support located forward of the operator's seat, and a third vertical support and a fourth vertical support located rearward of the operator's seat. At least one of the four vertical supports has an obstructing dimension to a line of sight of the operator at the operator's station. An exhaust outlet associated with the drive unit is located in general alignment with the at least one vertical support such that the exhaust outlet does not obstruct the field of view of the operator seated at the operator's station within the cab.

The four transparent panels are positioned between the four vertical supports. The four transparent panels include a first side transparent panel pivotally hinged to the first vertical support, and a second side transparent panel pivotally hinged to the third vertical support. The first and second side transparent panels are pivotable between a closed position and an open position to provide access to the cab. The four transparent panels further include a third transparent panel located forward of the steering wheel relative to the forward direction of travel, the preferred third transparent panel being preferably curvilinear-shaped and extending downward to the floor base of the cab enclosure. A fourth transparent panel is located rearward and opposite the third transparent panel relative to the forward direction of travel. The four transparent panels are configured to provide a three hundred-sixty degree field of view for the operator within the cab.

The preferred hood of the present invention includes a rearward end and a forward end, relative to the forward direction of travel of the agricultural applicator. The rearward end of the hood has a first width and the forward end of the hood has a second width that is greater than the first width of the rearward end of the hood. The rearward end of the hood can be positioned in general alignment with a top surface of the steering console so as to enhance an operator's forward field of view from the cab in a forward direction of travel. It is preferred that the hood be angled in a downward direction from the rearward toward the forward end in the forward direction of travel, such that the forward end of the hood (in a closed position) terminates adjacent to the steering plate of the steering assembly. Furthermore, the hood includes a plurality of louvers positioned at an angle such that, when the hood is in an open position, the louvers do not impede the field of view of the operator stationed within the cab.

The present invention thus relates to a configuration of an agricultural applicator and, more particularly, to a configuration of a three-wheeled agricultural applicator, which provides an operator seated at the operator's station within a cab an enhanced field of view not available with other three-wheeled agricultural applicator.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

A wide variety of vehicles could be constructed in accordance with the invention defined by the claims. Hence, while preferred embodiments of an enclosure in accordance with the invention will now be generally described with reference to a three-wheeled agricultural applicator, it should be understood that the invention is in no way so limited. The type of vehicle configured with enhanced visibility can vary.

Figure 1:
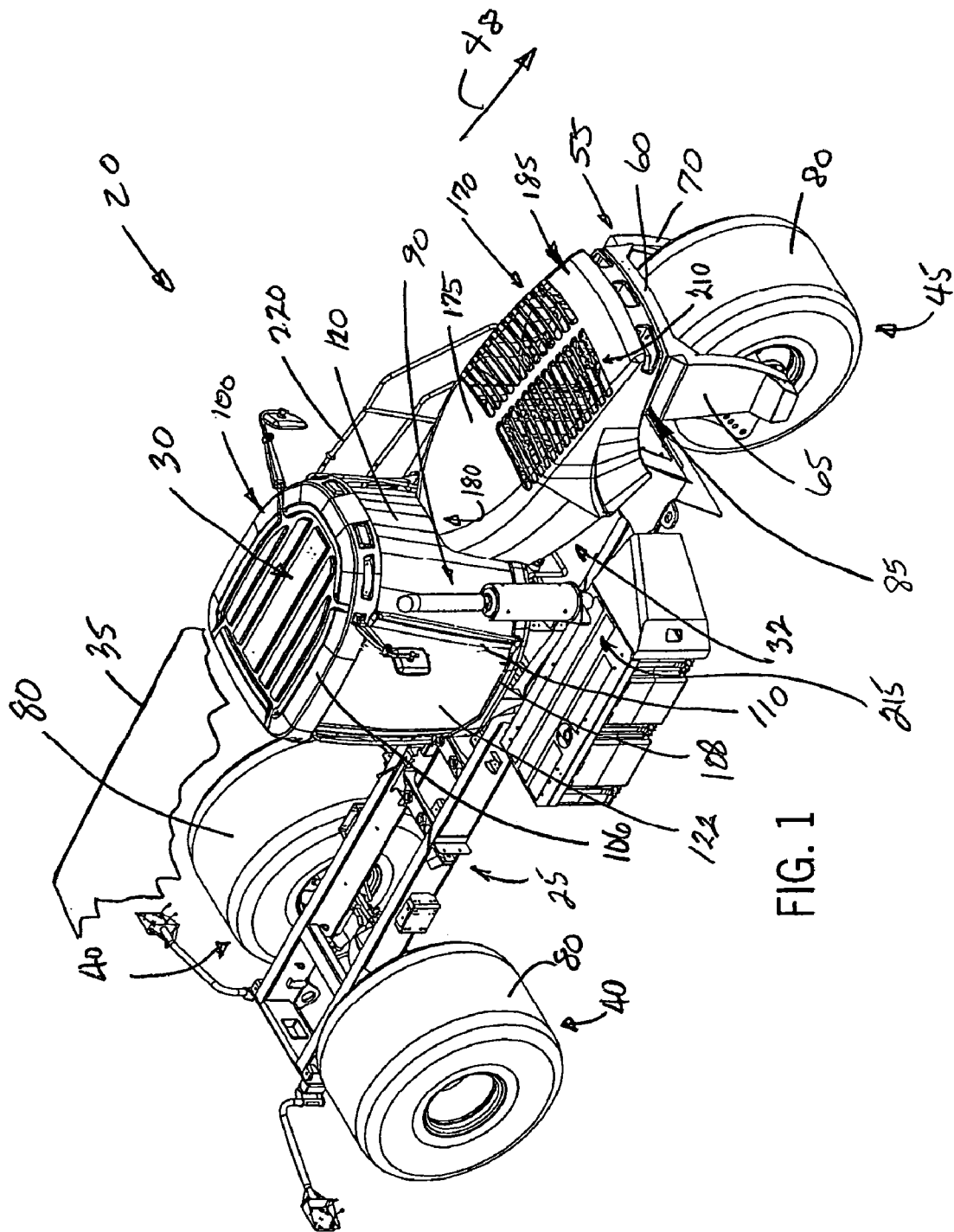
FIG. 1 illustrates an isometric view of a three-wheeled agricultural applicator in accordance with the present invention.
Figure 2:
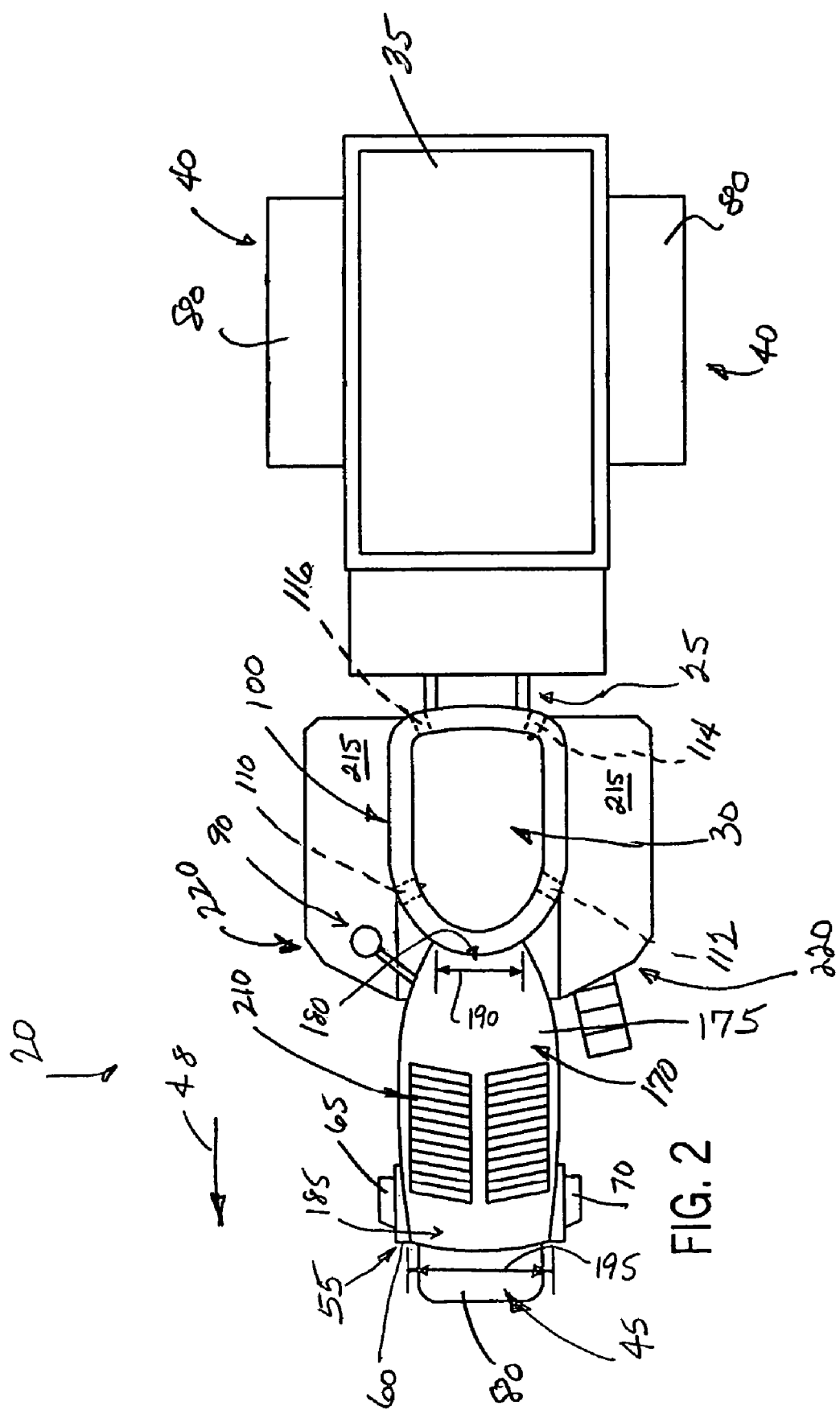
FIG. 2 illustrates a top view of the three-wheeled agricultural applicator in FIG. 1.

FIGS. 1 and 2 illustrate an agricultural applicator in accordance with the invention. The preferred agricultural applicator is a conventional agricultural applicator herein referred to as "floater" 20. The floater 20 is a type of agricultural applicator commonly used to apply crop nutrients or animal or human waste (sludge) to soils, typically before planting in the spring and/or after harvest in the fall. The floater 20 generally includes a frame assembly 25 in support of a cab 30, a drive unit 32 (See FIGS. 4 and 5), and one or more bulk storage tanks 35 on a plurality of wheel assemblies 40 and 45. The drive unit 32 enclosed by a hood assembly (discussed later) is generally configured to drive the floater 20 on the plurality of wheel assemblies 40 and 45 in a forward direction of travel (illustrated by arrow 48). The bulk storage tank 35 typically contains agricultural products such as liquid fertilizer or dry fertilizer. The floater 20 can also include a spray distribution assembly (not shown) for application of the stored agricultural product over an agricultural environment.

Figure 4:
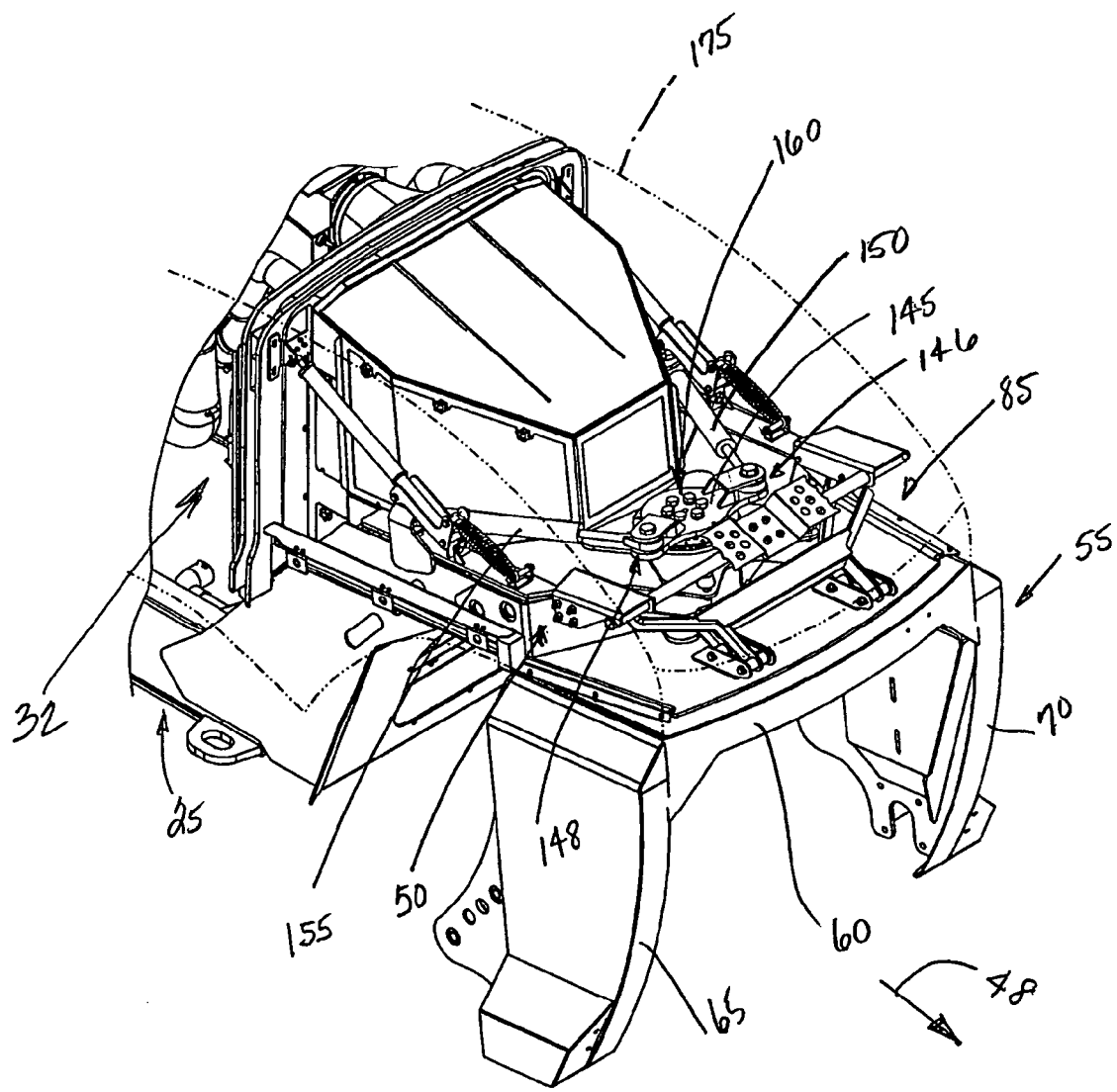
FIG. 4 illustrates a detailed isometric view of the steering assembly of the three-wheeled agricultural applicator in FIG. 1.
Figure 5:
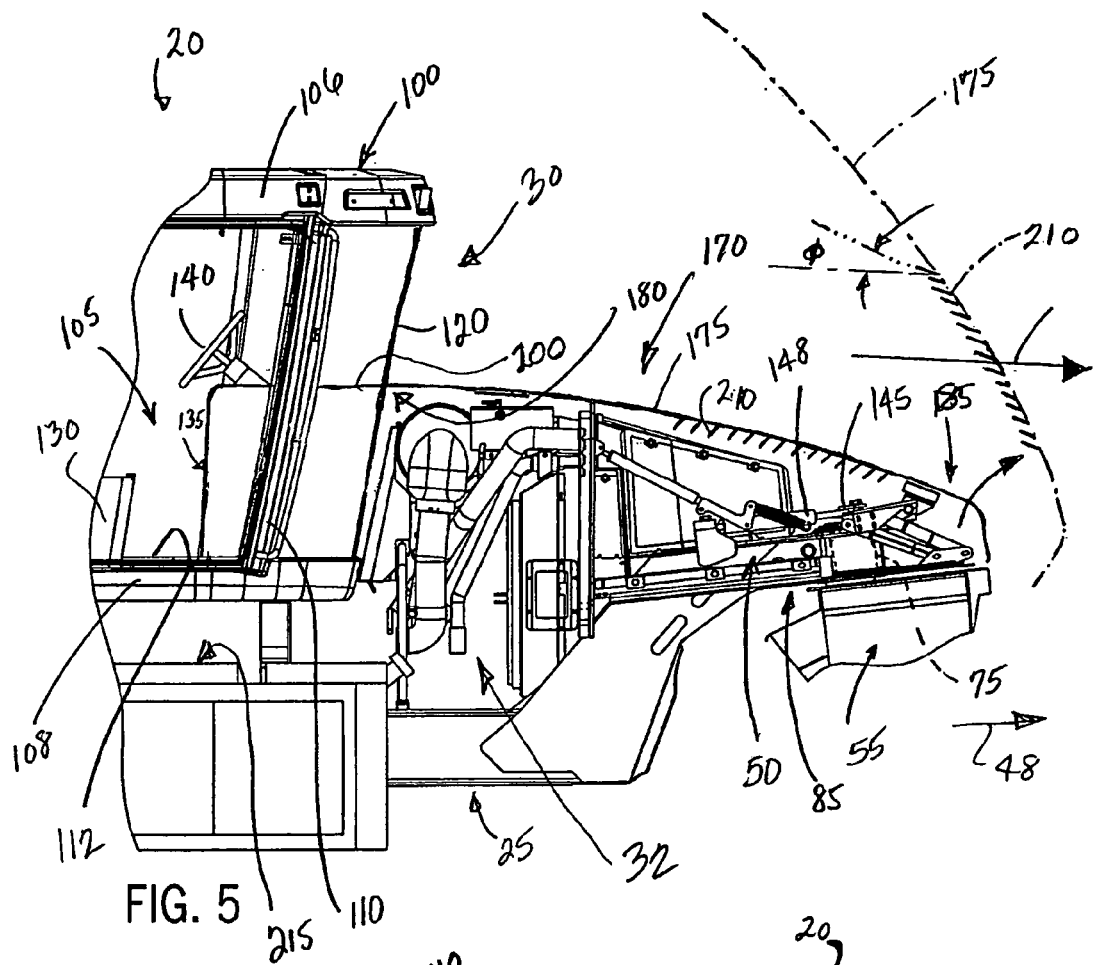
FIG. 5 illustrates a detailed side elevation view of the cab and the hood of the three-wheeled agricultural applicator in FIG. 1.

FIGS. 1 and 2 show a preferred embodiment of the floater 20 having a pair of rear wheel assemblies 40 and a single front wheel assembly 45. Although a three-wheeled floater is shown, the number of wheel assemblies 40 and 45 (e.g., a four-wheeled machine, etc.) can vary. Referring to FIGS. 4 and 5, the frame assembly 25 generally includes a front bearing structure 50 (See FIGS. 4 and 5) interlinked with a fork assembly 55. The fork assembly 55 is configured in a known manner to mount on the front wheel assembly 45 (See FIGS. 1 and 2). The fork assembly 55 generally includes a yoke portion 60 that extends between a first fork 65 and a second fork 70. The front wheel assembly 45 (See FIGS. 1 and 2) is mounted between the first and second forks 65 and 70, respectively. Referring to FIG. 5, a kingpin 75 extends upward from the yoke portion 60 and is rotatably mounted to the front bearing structure 50 of the frame assembly 25.

Still referring to FIGS. 1 and 2, each of the wheel assemblies 40 and 45 of the floater 20 typically employs over-sized floatation tires 80, which are configured to carry the floater 20 across agricultural terrain (varying from firm to soft, tilled, and sometimes muddy agricultural environments) with minimal soil compaction. The floatation tires 80 of the wheel assemblies 40 and 45 are typically very wide, e.g. forty-three inches.

Referring now to FIGS. 1 and 5, the drive unit 32 is positioned between the cab 30 and the forward end 85 of the frame assembly 25 relative to the forward direction of travel 48. The drive unit 32 typically includes an exhaust outlet 90 (e.g. muffler) (See FIG. 1) that extends vertically upward from a laterally off-set position relative to the centrally-positioned drive unit 32 on the frame assembly 25.

Figure 3:
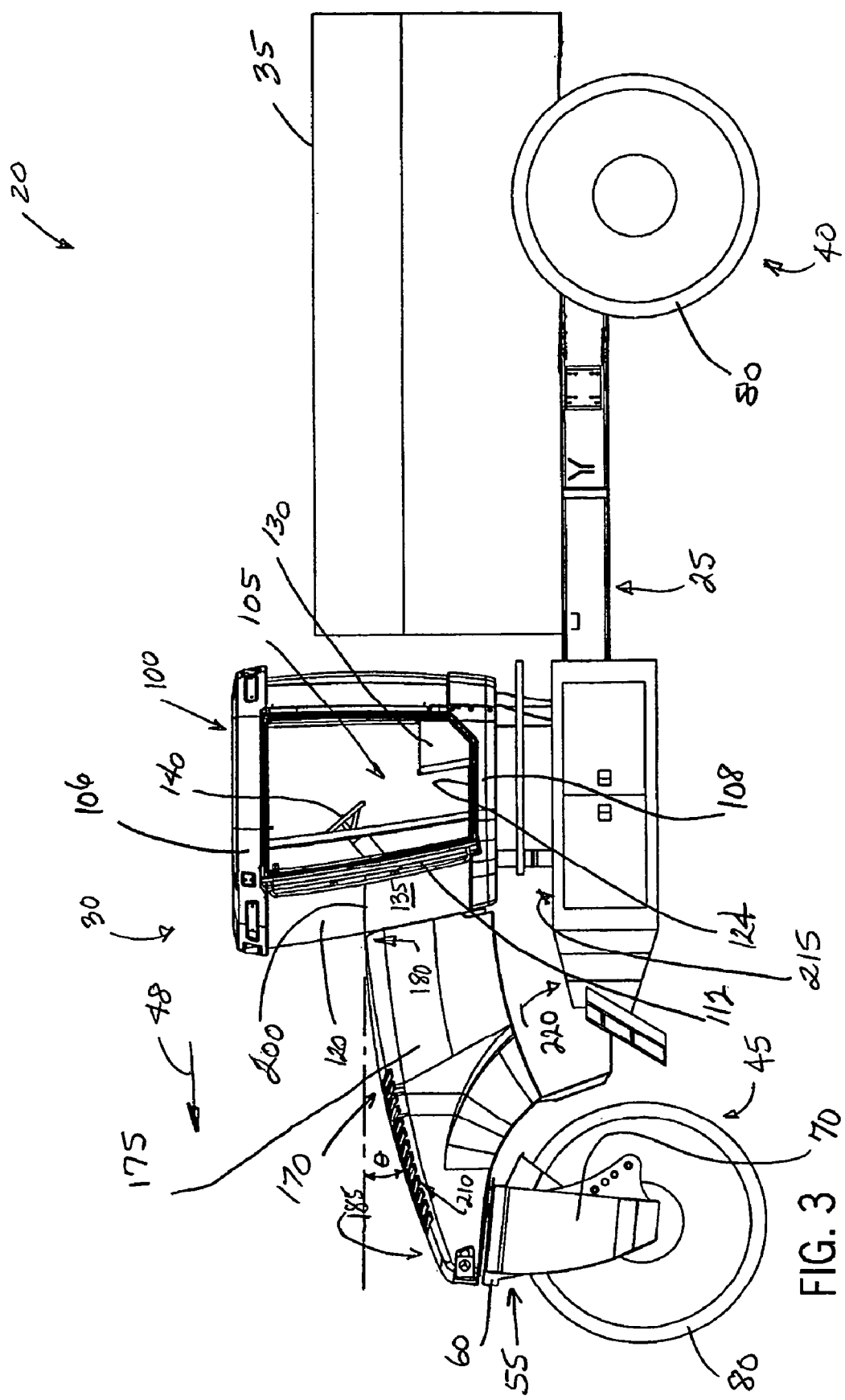
FIG. 3 shows a side elevation view of the three-wheeled agricultural applicator shown in FIG. 1.
Figure 6:
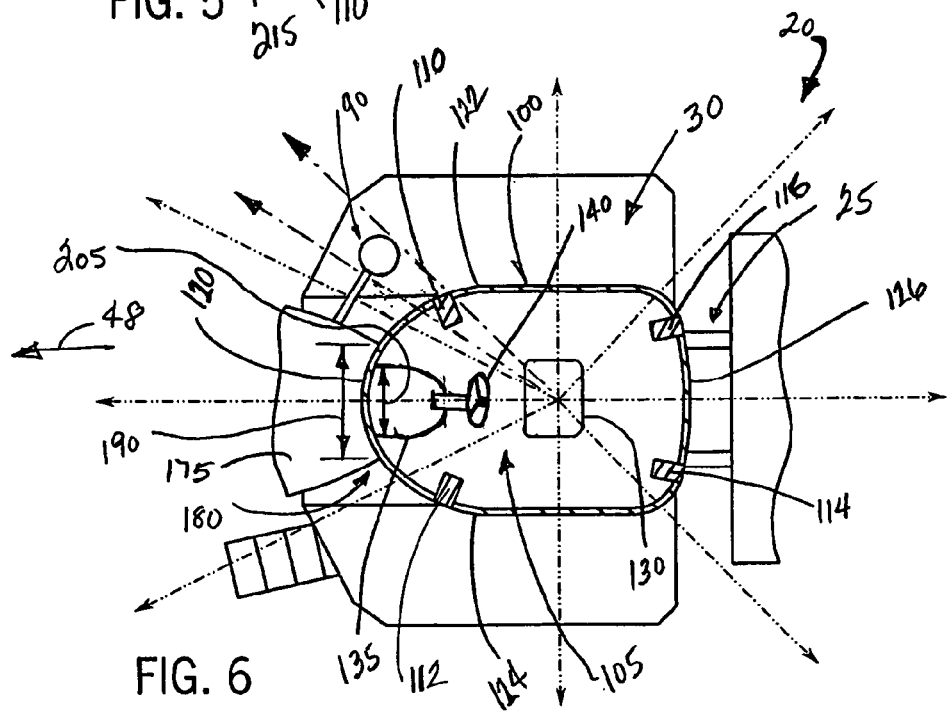
FIG. 6 is a schematic top view of an operator's station in the cab with respect to an exhaust outlet of the drive unit of the three-wheeled agricultural applicator in FIG. 1.

FIGS. 1, 3, and 6 illustrate a preferred cab 30 in accordance with the present invention. The cab 30 generally includes an enclosure 100 and an operator's station 105 (See FIGS. 3 and 6) located therein. The enclosure generally includes a ceiling support 106 (See FIGS. 1 and 3), a floor base 108 (See FIGS. 1 and 3), a series of vertical supports that includes a first vertical support 110, a second vertical support 112, a third vertical support 114, and a fourth vertical support 116, and a series of transparent panels 120, 122, 124 and 126 mounted therebetween. Referring specifically to FIG. 6, the preferred enclosure 100 includes only four vertical supports 110, 112, 114 and 116 in support of four transparent panels 120, 122, 124 and 126 in order to minimize obstruction to the field of view of the operator at the operator's station in the cab 30. The four transparent panels 120, 122, 124 and 126 are configured to provide an operator in the cab 30 with a three hundred-sixty degree field of view. The four transparent panels 120, 122, 124 and 126 include a first transparent panel 120 that is generally curvilinear-shaped and located between the first and second vertical supports 110 and 112. The preferred enclosure 100 further includes a second transparent panel 122 that is pivotally coupled to the first vertical support 110. A third transparent panel 124 is pivotally coupled to the third vertical support 114. Referring to FIGS. 1 and 3, the preferred series of transparent panels 120, 122, 124 and 126 are of a vertical height that extends from the ceiling support 106 down to the floor base 108 of the enclosure 100.

As illustrated in FIG. 6, from a perspective of an operator at the operator's station 105, the first vertical support 110 creates an obstructing dimension that extends generally perpendicular to a line of sight of the operator in the cab 30. The first vertical support 110 is located in general alignment between the operator's station 105 and the exhaust outlet 90 such that the exhaust outlet 90 does not create an additional obstruction beyond the limits of the first vertical support 110, relative to the field of view of the operator at the operator's station 105 within the cab 30.

Referring now to FIGS. 3, 5, and 6, the preferred operator's station includes a seat 130 and a steering console 135 with a steering wheel 140 extending therefrom. The steering console 135 and steering wheel 140 are located forward of and in general proximity to the seat 130 so as to allow the operator seated at the operator's station 105 to maneuver the floater 20, relative to the forward direction of travel 48, of the floater 20.

Referring to FIGS. 4 and 5, the steering wheel 140 is interlinked with a steering plate 145 attached at the top of the kingpin 75 (See FIG. 5) extending from the fork assembly 55. A left actuator 150 and a right actuator 155, relative to the forward direction of travel 48, are interconnected between the steering wheel 140 and the steering plate 145 in a known manner, such that rotation of the steering wheel 140 causes a respective rotation of the kingpin 75, the fork assembly 55, and mounted front wheel assembly 45 in a direction of a desired turn relative to the forward direction of travel 48.

Referring to FIG. 4, the steering plate 145 includes a left coupling 146 and right coupling 148 configured to attach to the left and right steering actuators 150 and 155, respectively. The steering plate 145 is directly attached by a series of fasteners 160 at the top of the kingpin 75 (See FIG. 5). Connecting the left and right steering actuators 150 and 155 directly to the steering plate 145 at the kingpin 75 allows the fork assembly 55 to be shortened. In contrast, the steering actuators of certain known floaters are attached at the fork assembly.

Referring to FIGS. 1–3 and 5–6, a hood assembly 170 is configured to enclose the drive unit 32 (See FIG. 5). As illustrated in FIG. 5, the preferred hood assembly 170 includes a hood 175 moveable between a closed position and an open position. Referring now to FIGS. 1–3, the hood 175 includes a rearward end 180 and a forward end 185. As illustrated in particular in FIG. 2, the rearward end 180 of the hood 175 includes a first width 190 and the forward end 185 of the hood 175 includes a second width 195 that is greater than the first width 190 of the rearward end 180 of the hood 175.

Referring now to FIGS. 4 and 5, the hood 175 has a low profile because the steering plate 145 is directly attached at the top of the kingpin 75. As illustrated in FIGS. 3 and 5, the low profile of the hood 175 enhances a field of view of the operator at the operator's station 105. Referring in particular to FIG. 3, the hood 175 is angled downward from the rearward end 180 towards the forward end 185 at an angle ($\theta$) with respect to horizontal. The rearward end 180 of the hood 175 is positioned in general alignment with a top surface 200 of the steering console 135 located in the cab 30. As illustrated in FIG. 6, the width 195 of the rearward end 190 of the hood 175 is preferably greater than a width 205 of the steering console 135. This configuration of the hood 175 generally aligns with a line of sight of the operator at the operator's station 105 within the cab 30, thus increasing the operator's field of the view.

As illustrated in FIGS. 3 and 6, this low profile configuration of the hood 175 relative to the steering console 135 (i.e., the hood 175 is in general alignment with the top surface 200 of the steering console 135) increases the operator's a field of view when seated at the operator's station 105. In contrast, hoods of known floaters are located at a raised position and are generally horizontally-aligned (i.e., not sloped) because the left and right steering actuators are directly connected at the fork assembly 55, and not to the steering plate 145 as in the present invention.

Referring now to FIG. 5, the hood 175 further includes a series of louvers 210. When the hood 175 is in the closed position (shown by solid lines in FIG. 5), the louvers 210 are generally aligned to provide a flow of air through the hood 175 to the drive unit 32. When the hood 175 is in the open position (shown by dashed lines in FIG. 5), the louvers 210 are positioned generally at an angle ($\phi$) with respect to horizontal (e.g., about seven degrees plus or minus two degrees) such that the louvers 210 do not obstruct a forward field of view of the operator seated at the operator's station 105 in the cab 30. The number and size of the louvers 210 can vary.

Referring back to FIGS. 1–3, the floater 25 further includes one or more side-mounted storage units 215. The one or more side-mounted storage units 215 may include a handrail 218 mounted thereon. Referring to FIG. 2, a forward portion 220 of the storage units 215 are angled inward (similar on both sides of floater 20) toward the frame assembly 25 at generally the rearward end 180 of the hood 175. Moreover, as shown in FIG. 3, the forward portion 220 of the storage units 215 are also angled downward toward the ground such that the forward and downward field of view of the operator seated at the operator's station 105 is not obstructed by the storage units 215.

Many changes and modifications could be made to the invention without departing from the spirit thereof. The scope of these changes will become apparent from the appended claims.

We claim:

1. A three-wheeled vehicle, comprising:
    a drive unit interconnected with a plurality of wheel assemblies in such a manner so as to drive the three-wheeled vehicle in a forward direction of travel, the plurality of wheel assemblies including a single front wheel assembly;
    a frame assembly mounted on the plurality of wheel assemblies, the frame assembly including a fork assembly having first and second forks depending from opposite ends of a yoke portion and a kingpin extending generally upward from the yoke portion, the fork assembly mounted on the single front wheel assembly; and
    a steering assembly including:
        a steering wheel;
        a steering plate interconnected to the kingpin; and
        left and right steering cylinders interlinking the steering wheel with the steering plate;
    wherein rotation of the steering wheel toward a turn direction of the three-wheeled vehicle relative to the forward direction of travel rotates the steering plate and attached kingpin and causes the fork assembly to rotate in the turn direction.

2. The three-wheeled vehicle as recited in claim 1, further comprising:
    a hood having a rearward end and a forward end relative to the forward direction of travel, wherein the hood is angled in a downward direction from the rearward end towards the forward end of the hood and adjacent to the steering plate.

3. The three-wheeled vehicle as recited in claim 2, wherein the hood includes a plurality of louvers, and wherein in the open position of the hood, the louvers are positioned at an angle with respect to horizontal such that the louvers do not obstruct a forward field of view of an operator seated rearward of the hood relative to the forward direction of travel.

4. The three-wheeled vehicle as recited in claim 1, further comprising:
    a cab supported by the frame assembly, the cab including an operator's station located inside of an enclosure of at least one transparent panel, the operator's station including a seat and a steering console in support of the steering wheel, the operator's station configured to allow an operator to maneuver the three-wheeled vehicle; and a hood mounted forward of the cab, the hood having a rearward end and a forward end relative to the forward direction of travel, the rearward end having a first width and the forward end having a second width, the second width being greater than the first width of the rearward end of the hood, wherein the steering wheel extends upward from the steering console mounted and located inside the cab, the steering console having a top surface, and wherein the rearward end of the hood is generally aligned with a top surface of the steering console.

5. The three-wheeled vehicle of as recited in claim 4, wherein the steering console has a width that is less than the width of the forward end of the hood.

6. The three-wheeled vehicle as recited in claim 4, wherein the cab includes at least one vertical support having an obstructing dimension to a line of sight of the operator seated at the operator's station, and wherein an exhaust outlet associated with the drive unit is located in general alignment with the at least one vertical support such that the exhaust outlet does not additionally obstruct a field of view of the operator seated at the operator's station.

7. The three-wheeled vehicle as recited in claim 4, wherein the enclosure includes:
  only four vertical supports between a floor support and a ceiling support, the four vertical supports including a first vertical support and a second vertical support located forward of the operator's seat, and a third vertical support and a fourth vertical support located rearward of the operator's seat; and
  only four transparent panels located between the four vertical supports, the four transparent panels including a first transparent panel pivotally hinged to the first vertical support, and a second transparent panel pivotally hinged to the third vertical support.

8. The three-wheeled vehicle as recited in claim 4, wherein the enclosure of the cab includes a ceiling support and a floor support, wherein the forward transparent panel is curvilinear-shaped and extends downward to the floor support of the cab enclosure.

9. The three-wheeled vehicle of as recited in claim 4, wherein the enclosure of the cab includes a plurality of transparent panels configured to provide an operator with a three hundred-sixty degree field of view from the cab.

10. The three-wheeled vehicle as recited in claim 4, wherein the vehicle includes one or more side-mounted walkways, the walkways located relative to the cab such that walkways do not obstruct a field of view of the operator seated at the operator's station.

11. A three-wheeled agricultural applicator, comprising:
a plurality of wheel assemblies including a single front wheel assembly;
a frame assembly mounted on the plurality of wheel assemblies, the frame assembly including a fork assembly having first and second forks depending from opposite ends of a yoke portion and a kingpin extending generally upward from the yoke portion, the fork assembly mounted on the single front wheel assembly;
a steering assembly including;
  a steering wheel;
  a steering plate interconnected to the kingpin; and
  left and right steering cylinders interlinking the steering wheel with the steering plate;
a cab supported by the frame assembly, the cab including an operator's station located inside of an enclosure of at least one transparent panels, the operator's station including a seat and a steering console configured to allow an operator to operate the agricultural applicator; and a hood mounted forward of the cab relative to the forward direction of travel, the hood having a rearward end and a forward end relative to the forward direction of travel, the rearward end having a first width and the forward end having a second width, the second width being greater than the first width of the rearward end of the hood, wherein the steering wheel extends upward from the steering console mounted and located inside the cab, the steering console having a top surface, and wherein the rearward end of the hood is generally aligned with a top surface of the steering console.

12. The three-wheeled agricultural applicator as recited in claim 11, wherein the cab enclosure includes a ceiling support and a floor support, wherein the at least one transparent panel is curvilinear-shaped and extends downward to the floor support of the cab enclosure.

13. The three-wheeled agricultural applicator as recited in claim 11, wherein the steering console has a width that is less than the width of the forward end of the hood.

14. The three-wheeled agricultural applicator as recited in claim 11, wherein the enclosure includes a plurality of transparent panels configured to provide 360-degree field of view for the operator seated at the operator's station.

15. The three-wheeled agricultural applicator as recited in claim 11, wherein the cab includes at least one vertical support having an obstructing dimension to a line of sight of the operator seated at the operator's station, and wherein an exhaust outlet associated with the drive unit is located in general alignment with the at least one vertical support such that the exhaust outlet does not obstruct a field of view of the operator seated at the operator's station.

16. The three-wheeled agricultural applicator as recited in claim 11, wherein the hood includes a plurality of louvers, the louvers positioned at an angle of about seven degrees with respect to horizontal such that when the hood is in an open position, the louvers do not obstruct a forward field of view of the operator seated at the operator's station.

17. The three-wheeled agricultural applicator as recited in claim 11, wherein the three-wheeled agricultural applicator includes one or more side-mounted walkways, the walkways located relative to the cab such that walkways do not obstruct a field of view of the operator seated at the operator's station.

18. The three-wheeled agricultural applicator as recited in claim 11, wherein the hood slopes in downward direction from the rearward end towards the forward end of the hood.

19. The three-wheeled agricultural applicator as recited in claim 11, wherein the transparent panels are curvilinear-shaped, and wherein the steering console has a width that is less than the width of the forward end of the hood.

20. The three-wheeled agricultural applicator as recited in claim 11, wherein the enclosure of the cab includes:
  only four vertical supports, the four vertical supports including a first vertical support and a second vertical support located forward of the operator's seat, and a third vertical support and a fourth vertical support located rearward of the operator's seat; and
  a plurality of transparent panels including a first transparent panel pivotally hinged to the first vertical support, and a second transparent panel pivotally hinged to the third transparent support.

* * * * *